United States Patent
Pandey et al.

(10) Patent No.: US 12,131,103 B2
(45) Date of Patent: Oct. 29, 2024

(54) SEMICONDUCTOR FABRICATION PROCESS PARAMETER DETERMINATION USING A GENERATIVE ADVERSARIAL NETWORK

(71) Applicant: KLA Corporation, Milpitas, CA (US)

(72) Inventors: Anuj Pandey, Delhi (IN); Wing-Shan Ribi Leung, Sunnyvale, CA (US)

(73) Assignee: KLA Corporation, Milpitas, CA (US)

( * ) Notice: Subject to any disclaimer, the term of this patent is extended or adjusted under 35 U.S.C. 154(b) by 468 days.

(21) Appl. No.: 17/211,011

(22) Filed: Mar. 24, 2021

(65) Prior Publication Data

US 2021/0303757 A1 Sep. 30, 2021

(30) Foreign Application Priority Data

Mar. 30, 2020 (IN) .............................. 202041013949

(51) Int. Cl.
| | |
|---|---|
| *G06F 30/30* | (2020.01) |
| *G06F 30/20* | (2020.01) |
| *G06F 30/31* | (2020.01) |
| *G06N 3/04* | (2023.01) |

(52) U.S. Cl.
CPC .............. *G06F 30/20* (2020.01); *G06F 30/31* (2020.01); *G06N 3/04* (2013.01)

(58) Field of Classification Search
CPC .......... G06F 30/20; G06F 30/31; G06F 30/27; G06F 30/398; G06F 2119/22; G06N 3/04; G06N 3/045; G06N 3/047; G06N 3/084; G06N 3/088
USPC ....................................................... 716/102
See application file for complete search history.

(56) References Cited

U.S. PATENT DOCUMENTS

| | | | |
|---|---|---|---|
| 7,253,094 B1 * | 8/2007 | Zhang | ............... H01L 21/02063 |
| | | | 257/E21.507 |
| 8,468,471 B2 | 6/2013 | Liu et al. | |
| 10,043,261 B2 | 8/2018 | Bhaskar et al. | |
| 10,395,356 B2 | 8/2019 | Zhang et al. | |
| 10,395,362 B2 | 8/2019 | Gupta et al. | |
| 10,818,001 B2 | 10/2020 | Leung et al. | |
| 11,372,070 B2 * | 6/2022 | Takeshima | ......... G01R 33/5608 |
| 2007/0070335 A1 * | 3/2007 | Goren | ................ G01N 21/8851 |
| | | | 356/237.2 |
| 2013/0092958 A1 * | 4/2013 | Chen | ..................... H01L 29/872 |
| | | | 257/77 |
| 2017/0193400 A1 | 7/2017 | Bhaskar et al. | |
| 2017/0345140 A1 | 11/2017 | Zhang et al. | |

(Continued)

OTHER PUBLICATIONS

Du et al., "Wafer SEM Image Generation with Conditional Generative Adversarial Network", Journal of Physics: conference series, Dec. 15, 2019, pp. 022041-1 to 022041-6, vol. 1486, IOPScience, Chengdu, China.

(Continued)

*Primary Examiner* — Jack Chiang
*Assistant Examiner* — Brandon Bowers
(74) *Attorney, Agent, or Firm* — Hodgson Russ LLP

(57) ABSTRACT

A device design file and material properties are inputted into a neural network module configured to operate a generative adversarial network. A process parameter is determined based on a device design file and material properties inputs using the generative adversarial network. This can be used to provide process parameters during semiconductor device design or manufacturing.

18 Claims, 4 Drawing Sheets

(56) References Cited

U.S. PATENT DOCUMENTS

| | | |
|---|---|---|
| 2017/0351952 A1 | 12/2017 | Zhang et al. |
| 2018/0330511 A1 | 11/2018 | Ha et al. |
| 2019/0095797 A1 | 3/2019 | Dhandapani et al. |
| 2019/0122911 A1 | 4/2019 | Briggs et al. |
| 2019/0130266 A1 | 5/2019 | Cao et al. |
| 2019/0130278 A1 | 5/2019 | Karras et al. |
| 2019/0187670 A1 | 6/2019 | Fang |
| 2019/0197368 A1 | 6/2019 | Madani et al. |
| 2019/0286983 A1 | 9/2019 | Jung et al. |
| 2019/0370432 A1 | 12/2019 | Sha et al. |
| 2019/0384236 A1 | 12/2019 | Lin et al. |

OTHER PUBLICATIONS

WIPO, ISR for International Application No. PCT/US2021/024262, Jul. 20, 2021.
Ye & Lin, LithoGAN: End-to-End Lithography Modeling with Generative Adversarial Network, Design Automation Conf., 2019.
Nero et al., Concept Recognition in Production Yield Data Analytics, Int'l Test Conf. 2018., Paper 9.3, 1-10.
Goodfellow et al., Generative Adversarial Nets, arXiv:1406.2661v1, Jun. 10, 2014, 1-9.
EPO, Extended European Search Report issued for EP Application No. 21781559.6, Mar. 7, 2024.

* cited by examiner

SEMICONDUCTOR FABRICATION PROCESS PARAMETER DETERMINATION USING A GENERATIVE ADVERSARIAL NETWORK

CROSS-REFERENCE TO RELATED APPLICATIONS

This application claims priority to the Indian patent application filed Mar. 30, 2020 and assigned Indian App. No. 202041013949, the disclosure of which is hereby incorporated by reference.

FIELD OF THE DISCLOSURE

This disclosure relates to semiconductor manufacturing.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Process development at advanced wafer level package (aWLP) facilities can take months or even more than a year to develop. Development time can depend on factors like design rule, design pattern, process tools, or process steps. Typically, the time to achieve satisfactory yield (e.g., >95%) can range from three months to a year and can require a large capital input.

Semiconductor manufacturers previously used a trial-and-error approach to find parameters. A process engineer can try to keep certain parameters constant and observe yield while changing two variables. A table of yield values could be formulated to correspond to the values of the two parameters being considered. This approach is time-consuming and expensive. Large amounts of effort and material are needed to develop the table of yield values. Increased time spent using this approach slows research and development, which increases the time to market.

Improved methods and systems are needed.

BRIEF SUMMARY OF THE DISCLOSURE

A system is provided in a first embodiment. The system includes a neural network module. The neural network module is configured to operate a generative adversarial network. The generative adversarial network is configured to generate a process parameter for a semiconductor device design based on a device design file and material properties inputs to the generative adversarial network.

The process parameter can include etch concentration, etch species, etch duration, implant dose, implant energy, implant species, or spin speed.

The device design file can be a GDS file.

The system can further include an imaging system with an energy source and a detector. The energy source is configured to generate energy that is directed to a wafer. The energy source may be an electron source or a light source. The detector is configured to detect energy reflected from the wafer to generate an image. The imaging system is in electronic communication with the neural network module. The imaging system is configured to transmit the image to the neural network module with related process parameters for additional training of the generative adversarial network.

A method is provided in a second embodiment. The method includes inputting a device design file for a semiconductor device and material properties to a neural network module. The neural network module is configured to operate a generative adversarial network. The process parameter is determined based on a device design file and material properties inputs using the generative adversarial network.

The process parameter can include etch concentration, etch species, etch duration, implant dose, implant energy, implant species, or spin speed.

The device design file can be a GDS file.

The method can further include selecting a process parameter associated with the device design using the neural network module.

The method can further include training the generative adversarial network using an image with related process parameters from an imaging system that includes an energy source and a detector. The energy source is configured to generate energy that is directed to a wafer and can be an electron source or a light source. The detector is configured to detect energy reflected from the wafer to generate the image. The imaging system is in electronic communication with the neural network module.

A computer program product comprising a non-transitory computer readable storage medium having a computer readable program is provided in a third embodiment. The computer readable program can be configured to carry out the method of the second embodiment.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein can determine process parameters by training an adversarial network using fabrication process data. Fabrication process data can be a set of data where the process parameters (e.g., design fabrication process material properties, angular speed of wafer rotation, temperature, etc.) are known. Whether the fabrication process data leads to good yield on devices also is known. The fabrication process data can be obtained across various layers, devices, design nodes, or design types (e.g., bumps, line-space, etc.) to train a network that can determine a set of process parameters for a new design, node, or device.

Sufficient data can be provided to the network so that the network can capture the trend of changing process parameters with changing design node. The network can predict appropriate process parameters for future smaller design rules or for a new design. For example, approximately 500 wafers per layer or per device may be included in a dataset to train the adversarial network, though other volumes of training data are possible.

Figure 1:
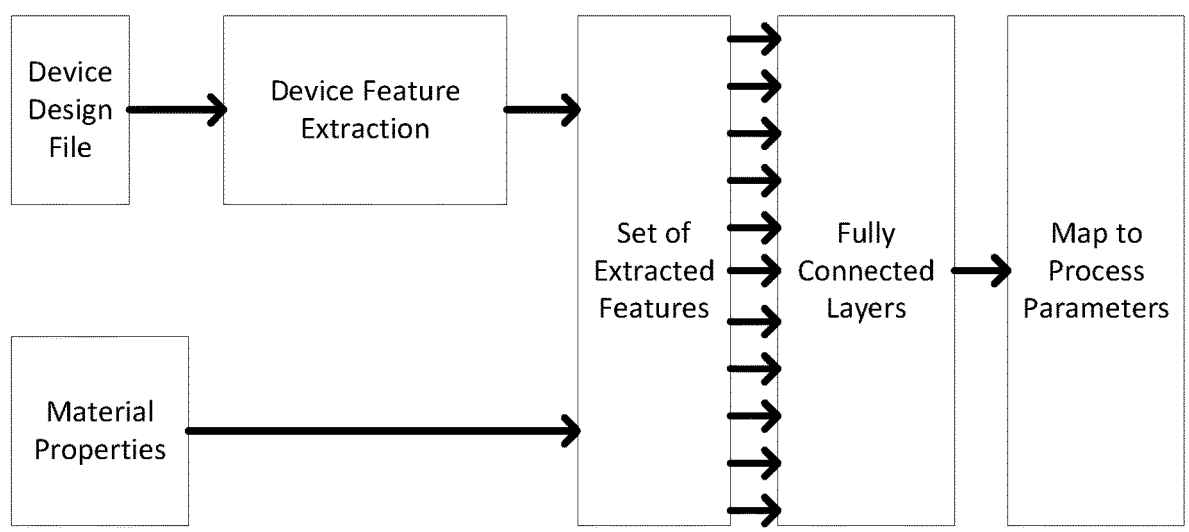
FIG. 1 is a generator network architecture for determining process parameters.

FIG. 1 is a generator network architecture for determining process parameters. The extracted layer features can be mapped into a fully connected network with the material properties as another parameter. Material properties can help account for the "layer type" in the model. For example, a photoresist layer or an etching layer likely have different process parameters that can be differentiated using their material properties. Since the device design file provides details for the design rule, it can provide approximately accurate process parameters even with design node shrinkage.

A device design file (e.g., GDS file) includes a die design for a semiconductor device. This device design file is an input for the neural network module with the corresponding material properties for the design. The material properties input can be a concatenated matrix of all the material properties, which can include physical properties used during fabrication (e.g., temperature, etching duration), shapes of the device (e.g., type of mask, curves, bends), dimensions of the device (e.g., length, height, width, critical dimension, bump diameter, trench size), material properties of the device or species used during fabrication (e.g., etch concentration, etch species), or other aspects of the die design. Wherever applicable, those material properties would be non-zero. Otherwise the material property is a zero indicating that the material is not applicable to that specific layer. Layers are added into the neural network module to extract mask features such as curves, bends, trench size, bump diameter, height, etc. These features are expected to impact yield of the process, so they can be taken as an input to the yield model.

Figure 2:
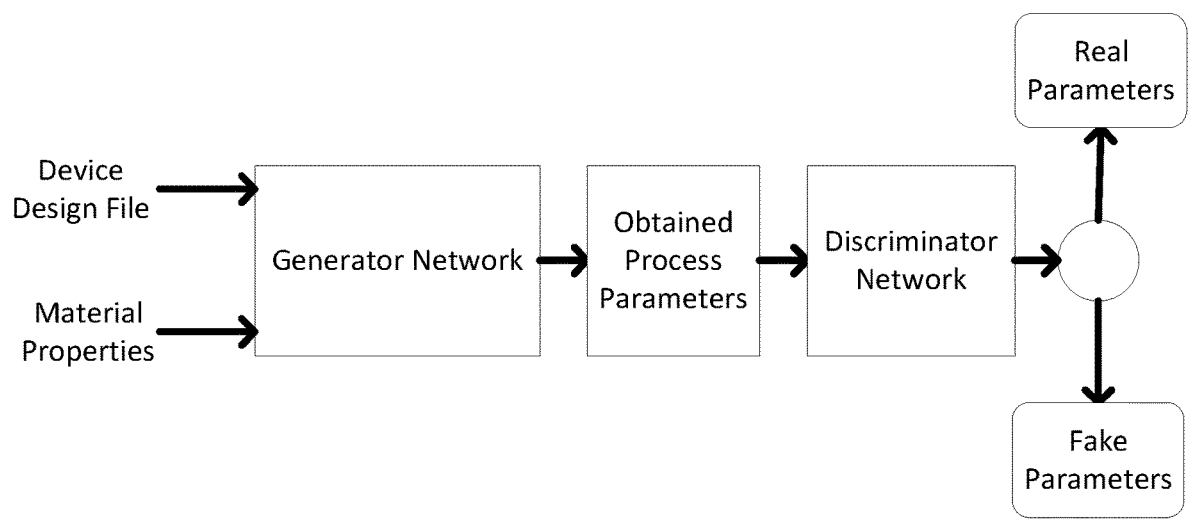
FIG. 2 is a discriminator network for differentiating between real and fake parameters.

FIG. 2 is a discriminator network for differentiating between real and fake parameters. As illustrated in FIG. 2, the output of the generator network is fed to the discriminator network, which learns a trend of parameter distribution in the attribute space of the real parameters. The trained network is then used to classify between real and fake parameters based on the parameter distribution in the attribute space.

The trained neural network can take a device design file and material properties as inputs. The trained neural network can provide accurate process parameters for device fabrication. This reduces product development time and saves research and development costs. The trained neural network attempts to determine optimum (or close to optimum) process parameters, which avoids the conventional trial and error method. This can reduce the amount of effort needed to develop new designs for semiconductor devices.

Figure 3:
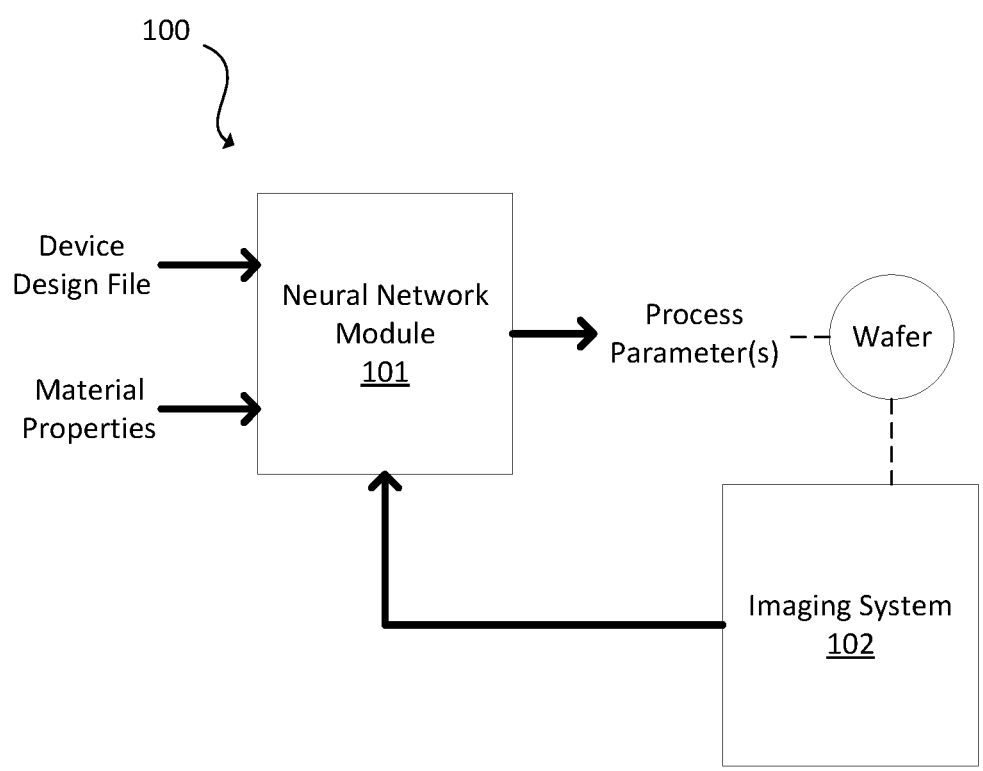
FIG. 3 is a block diagram of a system in accordance with the present disclosure.

FIG. 3 is a block diagram of a system 100. The system includes a neural network module 101. The neural network module 101 is configured to operate a generative adversarial network (GAN). The GAN is configured to generate a process parameter for a device design based on a device design file (e.g., a GDS file) and material properties inputs provided to the GAN, which may be numerical data in the form of a matrix. In an instance, the material properties can be fixed numbers. At deeper layers in the GAN, a design would be represented by convoluted values which would eventually be flattened into a vector. The design also may be concatenated with material properties.

The GDS file or other device design file contains the blueprint of what is printed on the wafer. The GDS files are typically large, running into 10's of GB in size. Different component, material, and process information are separated in the design file into cells, layers, and sublayers. For each layer/sublayer, the spatial design data is stored in geometric shapes or polygons.

The process parameter generated by the neural network module 101 can include etch concentration, etch species, etch duration, implant dose, implant energy, implant species, spin speed, anneal temperature, anneal duration, CMP slurry, CMP duration, or other parameters used during semiconductor manufacturing. These are merely examples, and other types of process parameters are possible. The process parameter may be associated with an entire design. When design convolution is performed, it can consider various features from a design file. As a final output, a user receives a process parameter for the entire die.

The system 100 also includes an imaging system 102 in electronic communication with the neural network module 101. The imaging system 102 includes an energy source and a detector. The energy source generates energy directed to a wafer (such as that illustrated in FIG. 3). The energy source may be, for example, a light source or an electron source. The detector is configured to detect energy reflected from the wafer to generate an image. The energy can be, for example, a beam of light, an electron beam, an ion beam, or another type of particle beam. For example, an optical inspection system or a scanning electron microscope can provide continuous feedback.

The imaging system 102 can further include a processor and storage medium. The processor can send instructions to direct the energy beam at the wafer and generate the image based on information from the detector.

The imaging system 102 or the processor in the imaging system 102 can be configured to transmit the image of the wafer to the neural network module 101. The image can be transmitted with the related process parameters for the layer or structure in the image. The image and related process parameters can be used for additional training of the GAN. Thus, a wafer created using the process parameters from the neural network module 101 can be used to further teach or reinforce the GAN in the neural network module 101. Other sample wafers or other production wafers also can be used to further teach or reinforce the GAN in the neural network module 101.

The neural network module 101 and the sub-systems therein can include a personal computer system, image computer, mainframe computer system, workstation, network appliance, internet appliance, or other device. The sub-system(s) or neural network module 101 may also include any suitable processor known in the art, such as a parallel processor. This processor can be used to operate the GAN. In an instance, the processor can be or can include a graphics processing unit (GPU). In addition, the sub-system (s) or neural network module 101 may include a platform with high speed processing and software, either as a stand-alone or a networked tool. The neural network module 101 can include or be coupled with a display and user-input device to select the desired process parameter.

In some embodiments, various steps, functions, and/or operations of neural network module 101 and the sub-systems therein and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor (or computer system) or, alternatively, multiple process (or multiple computer systems). Moreover, different sub-systems of the neural network module 101 may include one or more computing or logic systems. Therefore, the above description should not be interpreted as a limitation on the present disclosure but merely an illustration.

A GAN included in the embodiments described herein may be configured as described in "Generative Adversarial Nets" by Goodfellow et al. (Jun. 10, 2014), which is incorporated by reference in its entirety. A GAN can use a framework for estimating generative models via an adversarial process, in which two models are simultaneously trained: a generative model G that captures the data distribution, and a discriminative model D that estimates the probability that a sample came from the training data rather than G. The training procedure for G is to maximize the probability of D making a mistake. This framework corresponds to a minimax two-player game. In the space of arbitrary functions G and D, a unique solution exists, with G recovering the training data distribution and D equal to ½ everywhere. In the case where G and D are defined by a multilayer neural network or convolutional neural network (CNN), the entire system can be trained with backpropagation. There is no need for any Markov chains or unrolled approximate inference networks during either training or generation of samples. Experiments demonstrate the potential of the framework through qualitative and quantitative evaluation of the generated samples. The neural networks of the embodiments described herein may be further configured as described by Goodfellow.

In a GAN, the generative network generates candidates while the discriminative network evaluates candidates. Typically, the generative network learns to map from a latent space to a data distribution of interest and the discriminative network distinguishes candidates produced by the generator from the true data distribution. The generative network's training objective is to increase the error rate of the discriminative network. Thus, the generative network tries to "fool" the discriminator network by producing candidates that the discriminator network thinks are not synthesized (i.e., are part of the true data distribution).

A known dataset is used to train the discriminator. Training the discriminator includes presenting samples from the training dataset until the discriminator achieves acceptable accuracy. Training the generator involves determining whether the generator succeeds in fooling the discriminator. The generator may be seeded with randomized input sampled from a predefined latent space (e.g., a multivariate normal distribution). Thereafter, candidates synthesized by the generator can be evaluated by the discriminator. Independent backpropagation procedures are applied to both networks so that the generator produces better images, while the discriminator becomes more skilled at flagging synthetic images. The generator is typically a deconvolutional neural network, and the discriminator is typically a CNN. The generator and discriminator can be executed using one or more processors.

A CNN is a type of feed-forward artificial neural network in which the connectivity pattern between its neurons (i.e., pixel clusters) is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation.

CNNs may comprise of multiple layers of receptive fields. These are small neuron collections which process portions of the input image or images. The outputs of these collections are then tiled so that their input regions overlap to obtain a better representation of the original image. This may be repeated for every such layer. Tiling allows CNNs to tolerate translation of the input image. CNN may have a 3D volumes of neurons. The layers of a CNN may have neurons arranged in three dimensions: width, height, and depth. The neurons inside a layer are only connected to a small region of the layer before it, called a receptive field. Distinct types of layers, both locally and completely connected, are stacked to form a CNN architecture. CNNs exploit spatially local correlation by enforcing a local connectivity pattern between neurons of adjacent layers. The architecture can ensure that the learnt filters produce the strongest response to a spatially local input pattern. Stacking many such layers leads to non-linear filters that become increasingly global (i.e., responsive to a larger region of pixel space). This allows the network to first create good representations of small parts of the input, then assemble representations of larger areas from them. In CNNs, each filter is replicated across the entire visual field. These replicated units share the same parameterization (weight vector and bias) and form a feature map. This means that all the neurons in a given convolutional layer detect exactly the same feature. Replicating units in this way allows for features to be detected regardless of their position in the visual field, thus constituting the property of translation invariance.

Together, these properties can allow CNNs to achieve better generalization on vision problems. Weight sharing also helps by reducing the number of free parameters being learnt, thus lowering the memory requirements for running the network. Decreasing the memory footprint allows the training of larger, more powerful networks. CNNs may include local or global pooling layers, which combine the outputs of neuron clusters. Pooling layers may also consist of various combinations of convolutional and fully connected layers, with pointwise nonlinearity applied at the end of or after each layer. A convolution operation on small regions of input is introduced to reduce the number of free parameters and improve generalization. One advantage of convolutional networks is the use of shared weight in convolutional layers, which means that the same filter (weights bank) is used for each pixel in the layer. This also reduces memory footprint and improves performance.

A CNN architecture may be formed by a stack of distinct layers that transform the input volume into an output volume (e.g., holding class scores) through a differentiable function. A few distinct types of layers may be used. The convolutional layer has a variety of parameters that consist of a set of learnable filters (or kernels), which have a small receptive field, but extend through the full depth of the input volume. During the forward pass, each filter may be convolved across the width and height of the input volume, computing the dot product between the entries of the filter and the input and producing a two-dimensional activation map of that filter. As a result, the network learns filters that activate when they see some specific type of feature at some spatial position in the input. By stacking the activation maps for all filters along the depth dimension, a full output volume of the convolution layer is formed. Every entry in the output volume also can be interpreted as an output of a neuron that looks at a small region in the input and shares parameters with neurons in the same activation map.

When dealing with high-dimensional inputs such as images, it may be impractical to connect neurons to all neurons in the previous volume because such a network architecture does not take the spatial structure of the data into account. CNNs may exploit spatially local correlation by enforcing a local connectivity pattern between neurons of adjacent layers. For example, each neuron is connected to only a small region of the input volume. The extent of this connectivity is a hyperparameter called the receptive field of the neuron. The connections may be local in space (along width and height), but always extend along the entire depth of the input volume. Such an architecture can ensure that the learnt filters produce the strongest response to a spatially local input pattern. In one embodiment, training the CNN includes using transfer learning to create hyperparameters for each CNN. Transfer learning may include training a CNN on a very large dataset and then use the trained CNN weights either as an initialization or a fixed feature extractor for the task of interest.

Three hyperparameters control the size of the output volume of the convolutional layer: the depth, stride and zero-padding. Depth of the output volume controls the number of neurons in the layer that connect to the same region of the input volume. All of these neurons will learn to activate for different features in the input. For example, if the first CNN layer takes the raw image as input, then different neurons along the depth dimension may activate in the presence of various oriented edges, or blobs of color. Stride controls how depth columns around the spatial dimensions (width and height) are allocated. When the stride is one, a new depth column of neurons is allocated to spatial positions only one spatial unit apart. This leads to heavily overlapping receptive fields between the columns, and also to large output volumes. Conversely, if higher strides are used then the receptive fields will overlap less and the resulting output volume will have smaller dimensions spatially. Sometimes it is convenient to pad the input with zeros on the border of the input volume. The size of this zero-padding is a third hyperparameter. Zero padding provides control of the output volume spatial size. In particular, sometimes it is desirable to exactly preserve the spatial size of the input volume.

In some embodiments, a parameter sharing scheme may be used in layers to control the number of free parameters. If one patch feature is useful to compute at some spatial position, then it may also be useful to compute at a different position. In other words, denoting a single two-dimensional slice of depth as a depth slice, neurons in each depth slice may be constrained to use the same weights and bias.

Since all neurons in a single depth slice may share the same parametrization, then the forward pass in each depth slice of the layer can be computed as a convolution of the neuron's weights with the input volume. Therefore, it is common to refer to the sets of weights as a filter (or a kernel), which is convolved with the input. The result of this convolution is an activation map, and the set of activation maps for each different filter are stacked together along the depth dimension to produce the output volume.

Sometimes, parameter sharing may not be effective, for example, when the input images to a CNN have some specific centered structure, in which completely different features are expected to be learned on different spatial locations.

Pooling is another feature of CNNs, which is a form of non-linear down-sampling. There are several non-linear functions to implement pooling among which max pooling is one. Max pooling partitions the input image into a set of non-overlapping rectangles and, for each such sub-region, outputs the maximum. Once a feature has been found, its exact location may not be as important as its rough location relative to other features. The function of the pooling layer may be to progressively reduce the spatial size of the representation to reduce the amount of parameters and computation in the network, and hence to also control overfitting. A pooling layer may be positioned in-between successive cony layers in a CNN architecture.

Another layer in a CNN may be a ReLU (Rectified Linear Units) layer. This is a layer of neurons that applies a non-saturating activation function. A ReLU layer may increase the nonlinear properties of the decision function and of the overall network without affecting the receptive fields of the convolution layer.

Finally, after several convolutional and/or max pooling layers, the high-level reasoning in the neural network is completed via fully connected layers. Neurons in a fully connected layer have full connections to all activations in the previous layer. Their activations can hence be computed with a matrix multiplication followed by a bias offset.

In some embodiments, dropout techniques may be utilized to prevent overfitting. As referred to herein, dropout techniques are a regularization technique for reducing overfitting in neural networks by preventing complex co-adaptations on training data. The term "dropout" refers to dropping out units (both hidden and visible) in a neural network. For example, at each training stage, individual nodes may be either "dropped out" of the CNN with probability 1-p or kept with probability p, so that a reduced CNN remains. In some embodiments, incoming and outgoing edges to a dropped-out node may also be removed. Only the reduced CNN is trained. Removed nodes may then be reinserted into the network with their original weights.

In training stages, the probability a hidden node will be retained (i.e., not dropped) may be approximately 0.5. For input nodes, the retention probability may be higher. By avoiding training all nodes on all training data, dropout decreases overfitting in CNNs and improves the speed of training.

Training data may be inputted to model training (e.g., CNN training), which may be performed in any suitable manner. For example, the model training may include inputting the training data to the CNN and modifying one or more parameters of the model until the output of the model is the same as (or substantially the same as) external validation data. Model training may generate one or more trained models, which may then be sent to model selection, which is performed using validation data. The results that are produced by each one or more trained models for the validation data that is input to the one or more trained models may be compared to the validation data to determine which of the models is the best model. For example, the model that produces results that most closely match the validation data may be selected as the best model. Test data may then be used for model evaluation of the model that is selected (e.g., the best model). Model evaluation may be performed in any suitable manner. Best model may also be sent, to model deployment in which the best model may be sent to the semiconductor inspection tool for use (post-training mode).

Many different types of CNNs may be used in embodiments of the present disclosure. Different CNNs may be used based on certain scanning modes or circumstances. The configuration of a CNN may change based on the wafer, image data acquisition subsystem, or predetermined parameters.

Deconvolutional networks are CNNs that work in a reversed process. Deconvolutional networks, also known as deconvolutional neural networks, are similar in nature to CNNs run in reverse. Deconvolutional networks strive to find lost features or signals that may have previously not been deemed important to a CNN's task. A signal may be lost due to having been convoluted with other signals. The deconvolution of signals can be used in both image synthesis and analysis.

Figure 4:
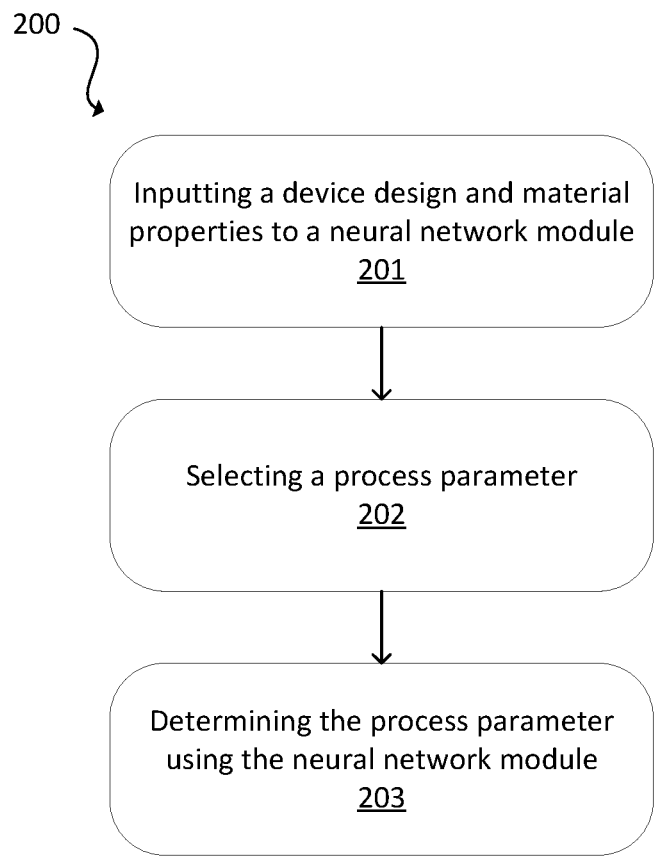
FIG. 4 is a flowchart of a method in accordance with the present disclosure.

FIG. 4 is a flowchart of a method 200, which can use the system 100 of FIG. 3. At 201, a device design and material properties are inputted to a neural network module that operates a GAN.

Process parameters associated with the device design are optionally selected at 202 using the neural network module. A user can optionally select a process parameter from a list of options. This process parameter can be for an entire design layer or after highlighting a portion of the device design.

At 203, the process parameter is determined using the GAN based on a device design input and material properties inputs. This may be for some or all of a design layer. If for an entire design layer, the GAN may provide a list of process parameters based on the inputs. Thus, the GAN can provide one process parameter for a given design or can provide multiple parameters for a given design.

In an example, a user wants to determine an optimal etch concentration for a particular logic structure on a wafer. The user inputs the device design file and the material properties of the structure into the neural network module. For example, the user may select a portion of the logic structure and specify the materials used in the structure. The user can then optionally select etch concentration from a list of possible process parameters. The neural network module determines an optimal etch concentration to create the desired logic structure. The neural network module also can provide queue time and/or spin speed for the etch step.

In another example, the user inputs the device design file and the material properties of the structure into the neural network module. The neural network module determines an optimal etch concentration, queue time, and spin speed to create the desired logic structure. The neural network also can provide other process parameters applicable to the design or the layer of the design.

While the example above is for a logic device, the embodiments disclosed herein have applications for memory devices or other devices.

The device design file, such as a GDS file, may include numerical data. Thus, the device design file may not be an image. Images can be deconstructed and turned into numerical values similar to a GDS file. Material properties also can be inputted as numerical values.

The GAN can be trained using an image with related process parameters from an imaging system, such as the imaging system 102 in FIG. 3. The imaging system sends images of wafers and associated process parameters used to manufacture those wafers to train the GAN. Thus, scanning electron microscope images or optical images can be used to train the GAN. In an instance, median reference die (MRD) images can be used to train the GAN.

An additional embodiment relates to a non-transitory computer-readable medium storing program instructions executable using a processor for performing a computer-implemented method for determining process parameters, as disclosed herein. An electronic data storage unit or other storage medium may contain non-transitory computer-readable medium that includes program instructions executable on the neural network module. The computer-implemented method may include any step(s) of any method(s) described herein, including method 200.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a neural network module, wherein the neural network module is configured to operate a generative adversarial network, wherein the generative adversarial network is configured to generate a process parameter for a semiconductor device design based on a device design file and material properties inputs to the generative adversarial network, and wherein the device design file includes a die design for a semiconductor device, and wherein the material properties inputs include a matrix of numerical data representing at least a physical property, shape, dimension, and material of a layer of the die design.

2. The system of claim 1, wherein the process parameter includes etch concentration, etch species, or etch duration.

3. The system of claim 1, wherein the device design file is a GDS file.

4. The system of claim 1, further comprising an imaging system that includes an energy source and a detector, wherein the energy source is configured to generate energy that is directed to a wafer, wherein the detector is configured to detect energy reflected from the wafer to generate an image, wherein the imaging system is in electronic communication with the neural network module, and wherein the imaging system is configured to transmit the image to the neural network module with related process parameters for additional training of the generative adversarial network.

5. The system of claim 4, wherein the energy source is an electron source.

6. The system of claim 4, wherein the energy source is a light source.

7. The system of claim 1, wherein the process parameter includes spin speed.

8. The system of claim 1, wherein the process parameter includes implant dose, implant energy, or implant species.

9. A method comprising:
inputting a device design file for a semiconductor device and material properties to a neural network module, wherein the neural network module is configured to operate a generative adversarial network; and
determining the process parameter based on a device design file and material properties inputs using the generative adversarial network, wherein the device design file includes a die design for a semiconductor device, and wherein the material properties inputs include a matrix of numerical data representing at least a physical property, shape, dimension, and material of a layer of the die design.

10. The method of claim 9, wherein the process parameter includes etch concentration, etch species, or etch duration.

11. The method of claim 9, wherein the device design input is a GDS file.

12. The method of claim 9, further comprising selecting a process parameter associated with the device design using the neural network module.

13. The method of claim 9, further comprising training the generative adversarial network using an image with related process parameters from an imaging system that includes an energy source and a detector, wherein the energy source is configured to generate energy that is directed to a wafer, wherein the detector is configured to detect energy reflected from the wafer to generate the image, and wherein the imaging system is in electronic communication with the neural network module.

14. The method of claim 13, wherein the energy source is an electron source.

15. The method of claim 13, wherein the energy source is a light source.

16. A computer program product comprising a non-transitory computer readable storage medium having a computer readable program embodied therewith, the computer readable program configured to carry out the method of claim 9.

17. The method of claim 9, wherein the process parameter includes spin speed.

18. The method of claim 9, wherein the process parameter includes implant dose, implant energy, or implant species.

* * * * *